US012645435B2

(12) United States Patent　　　　　　　　(10) Patent No.: US 12,645,435 B2

Savalle et al.　　　　　　　　　　　　　　　(45) Date of Patent:　　　　Jun. 2, 2026

(54) USING A LARGE LANGUAGE MODEL FOR CODE GENERATION FOR NETWORK ANALYTICS WITH CODING HINTS

(71) Applicant: Cisco Technology, Inc., San Jose, CA (US)

(72) Inventors: Pierre-André Savalle, Rueil-Malmaison (FR); Grégory Mermoud, Venthône (CH); Jean-Philippe Vasseur, Combloux (FR)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 18/234,630

(22) Filed: Aug. 16, 2023

(65) Prior Publication Data

US 2025/0060949 A1　　Feb. 20, 2025

(51) Int. Cl.
*G06F 8/35*　　　　　(2018.01)
*G06F 11/3604*　　　(2025.01)

(52) U.S. Cl.
CPC ............ *G06F 8/35* (2013.01); *G06F 11/3608* (2013.01)

(58) Field of Classification Search
CPC ....................................................... G06F 8/35
See application file for complete search history.

(56) References Cited

U.S. PATENT DOCUMENTS

| | | | | |
|---|---|---|---|---|
| 9,417,853 | B1 * | 8/2016 | Fischer ..................... | G06F 8/34 |
| 9,875,087 | B2 | 1/2018 | Scholz et al. | |
| 11,537,368 | B2 | 12/2022 | Brown et al. | |
| 11,726,750 | B1 * | 8/2023 | Arcadinho ................ | G06F 8/33 |
| | | | | 717/113 |
| 11,941,378 | B1 * | 3/2024 | Adler ......................... | G06F 8/35 |
| 2019/0102379 | A1 * | 4/2019 | First ......................... | G06F 40/30 |
| 2021/0191696 | A1 | 6/2021 | Ibarra Von Borstel et al. | |
| 2021/0224043 | A1 | 7/2021 | Mont-Reynaud et al. | |
| 2021/0357194 | A1 * | 11/2021 | Guo ......................... | G06F 8/315 |
| 2022/0382527 | A1 * | 12/2022 | Wang ..................... | G06F 18/214 |
| 2022/0413874 | A1 | 12/2022 | Awadallah et al. | |
| 2023/0112921 | A1 * | 4/2023 | Cai ........................... | G06F 8/31 |
| | | | | 717/104 |
| 2023/0177261 | A1 * | 6/2023 | Clement ................. | G06F 40/40 |
| | | | | 704/9 |
| 2023/0281308 | A1 * | 9/2023 | Maimon ............... | G06F 21/563 |
| | | | | 726/25 |
| 2023/0305822 | A1 * | 9/2023 | Ferrucci ................... | G06F 8/41 |
| 2023/0418565 | A1 * | 12/2023 | Arumugam Selvaraj ................... G06F 16/3322 |

(Continued)

OTHER PUBLICATIONS

Griebl, Elisabeth, et al. "On the applicability of language models to block-based programs." 2023 IEEE/ACM 45th International Conference on Software Engineering (ICSE). IEEE, 2023.*

Xu, Frank F., Bogdan Vasilescu, and Graham Neubig. "In-ide code generation from natural language: Promise and challenges." ACM Transactions on Software Engineering and Methodology (TOSEM) 31.2 (2022).*

(Continued)

*Primary Examiner* — Francisco J Aponte

(74) *Attorney, Agent, or Firm* — Lee & Hayes, P.C.

(57)　　　　　　　ABSTRACT

In one implementation, a device pauses generation of computer code by a language model. The device matches a block of the computer code to a hint regarding a portion of the block of computer code. The device inserts the hint into the computer code. The device resumes generation of the computer code by the language model, wherein the language model uses the hint to generate a new portion of the computer code.

20 Claims, 12 Drawing Sheets

(56) References Cited

U.S. PATENT DOCUMENTS

| | | | | |
|---|---|---|---|---|
| 2023/0418815 A1* | 12/2023 | Zorn | | G06F 40/18 |
| 2024/0127112 A1* | 4/2024 | Ziegler | | G06N 20/00 |
| 2024/0248686 A1* | 7/2024 | Garg | | G06F 8/36 |
| 2024/0256423 A1* | 8/2024 | Zhang | | G06F 8/71 |
| 2024/0311093 A1* | 9/2024 | Schaefer | | G06F 8/37 |
| 2024/0311094 A1* | 9/2024 | Auld | | G06F 8/35 |
| 2024/0361996 A1* | 10/2024 | Fu | | G06F 8/73 |
| 2024/0403438 A1* | 12/2024 | Chan | | G06F 11/0793 |
| 2025/0013441 A1* | 1/2025 | Schneider | | G06F 8/41 |
| 2025/0021309 A1* | 1/2025 | Schmidt | | G06F 8/34 |
| 2025/0045024 A1* | 2/2025 | Ngiam | | G06F 8/35 |
| 2025/0045049 A1* | 2/2025 | Sundaresan | | G06F 8/77 |
| 2025/0068417 A1* | 2/2025 | Van Der Sman | | G06F 8/73 |

OTHER PUBLICATIONS

Izadi, Maliheh, et al. "Language models for code completion: A practical evaluation." Proceedings of the IEEE/ACM 46th International Conference on Software Engineering. 2024.*

Wang, Chong, et al. "Teaching code llms to use autocompletion tools in repository-level code generation." ACM Transactions on Software Engineering and Methodology 34.7 (2025).*

"ReLLM", online: https://github.com/r2d4/rellm/tree/main, accessed Aug. 10, 2023, 5 pages.

Poesia, et al., "Synchromesh: Reliable code generation from pre-trained language models." arXiv preprint arXiv:2201.11227 (2022), 19 pages.

* cited by examiner

500

LANGUAGE MODEL PROCESS 249

CODE
INTELLIGENCE
LOGIT
PROCESSOR
506

NOTEBOOK
INTERPRETER
504

LANGUAGE
MODEL
502

MODEL
FINE-TUNING
ENGINE
510

AGENT
508

NETWORK
CONTROLLER
514

USER
INTERFACE
512

600

602

You have access to an API client with the following methods:

- client.list_cats: return a list of cats
- client.get_cat: get a cat by name, and return details about the cat such as height and weight Write Python code to print the heaviest cat

604

```
# First, we need to get a list of all the cats
cat_list = client.list_cats()

# We'll initialize a variable to keep track of the heaviest cat we've seen so far
heaviest_cat= None

# Now we'll loop through the list of cats and check each one's weight
for cat in cat_list:
    cat_details client.get_cat(cat)
    cat_weight=cat_details[weight"]
    if heaviest_cat is None or cat_weight > heaviest_cat["weight"]:
        heaviest_cat= cat_details

# Finally, we'll print out the details of the heaviest cat
print("The heaviest cat is", heaviest_cat['name'], "weighing", heaviest_cat['weight'], "pounds.")
```

606

```
Code output:
TypeError: unhashable type: 'dict' at line 8:
  6 # Now we'll loop through the list of cats and check each one's weight
  7 for cat in cat_list:
--> 8    cat_details client.get_cat(cat)
  9    cat_weight=cat_details[weight"]
  10    if heaviest_cat is None or cat_weight > heaviest_cat['weight']:
```

FIG. 6A

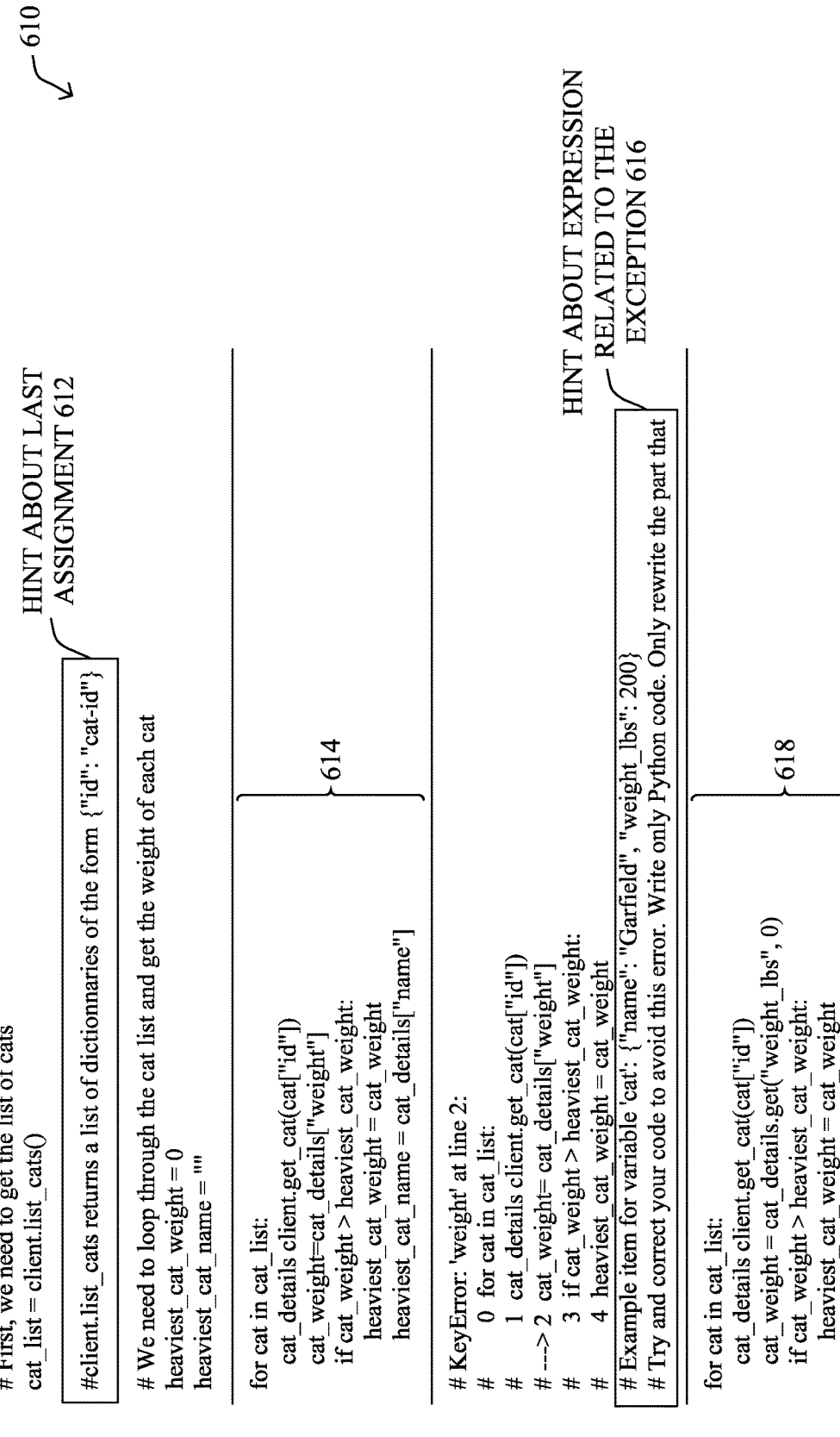

610

HINT ABOUT LAST ASSIGNMENT 612

```
# First, we need to get the list of cats
cat_list = client.list_cats()

#client.list_cats returns a list of dictionnaries of the form {"id": "cat-id"}

# We need to loop through the cat list and get the weight of each cat
heaviest_cat_weight = 0
heaviest_cat_name = ""

for cat in cat_list:
    cat_details client.get_cat(cat["id"])
    cat_weight=cat_details["weight"]
    if cat_weight > heaviest_cat_weight:
        heaviest_cat_weight = cat_weight
        heaviest_cat_name = cat_details["name"]
```

614

```
# KeyError: 'weight' at line 2:
#    0  for cat in cat_list:
#    1    cat_details client.get_cat(cat["id"])
# --> 2  cat_weight= cat_details["weight"]
#    3    if cat_weight > heaviest_cat_weight:
#    4      heaviest_cat_weight = cat_weight
# Example item for variable 'cat': {"name": "Garfield", "weight_lbs": 200}
# Try and correct your code to avoid this error. Write only Python code. Only rewrite the part that
```

HINT ABOUT EXPRESSION RELATED TO THE EXCEPTION 616

```
for cat in cat_list:
    cat_details client.get_cat(cat["id"])
    cat_weight = cat_details.get("weight_lbs", 0)
    if cat_weight > heaviest_cat_weight:
        heaviest_cat_weight = cat_weight
        heaviest_cat_name = cat_details["name"]
```

618

```
# Now we have the name of the heaviest cat, we can print it
print(heaviest_cat_name)  # this will print the name of the heaviest cat
```

FIG. 6B

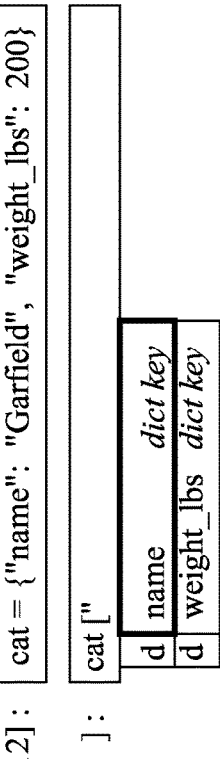
FIG. 7A

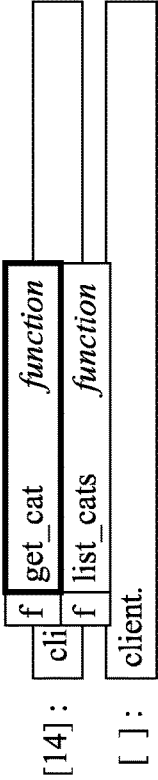
FIG. 7B

USING A LARGE LANGUAGE MODEL FOR CODE GENERATION FOR NETWORK ANALYTICS WITH CODING HINTS

TECHNICAL FIELD

The present disclosure relates generally to using a large language model (LLM) for code generation for network analytics with coding hints.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available bandwidth, packet loss, jitter, and the like, to ensure that the experiences of users of the network are not impinged.

The recent breakthroughs in Large Language Models (LLMs) present new opportunities to develop enhanced user interfaces for network analytics systems. Indeed, LLMs such as ChatGPT and GPT-4 are able to interact with tools (also called plugins), to perform tasks such as searching the web, executing code, etc. In some instances, an LLM could even write computer code on the fly, to perform such functions.

While LLMs remain a promising technology, extending them to complex systems such as network analytics systems remains challenging, as the dynamic nature of these systems often lead to situations in which the LLM encounters scenarios outside of those on which the model was trained. For instance, consider the case in which the LLM is instructed to write code to access data via an application programming interface (API), but has no knowledge as to the format of a certain expression to be queried. In such a case, executing the resulting code from the LLM may result in an error. In other words, the very nature of network analytics systems and other such highly-dynamic systems essentially act as moving targets for LLMs.

BRIEF DESCRIPTION OF THE DRAWINGS

The implementations herein may be better understood by referring to the following description in conjunction with the accompanying drawings in which like reference numerals indicate identically or functionally similar elements, of which:

FIGS. 6A-6B illustrate examples of the generation of code by a language model with coding hints;

FIGS. 7A-7B illustrate examples of providing coding hints using dictionary keys.

DESCRIPTION OF EXAMPLE IMPLEMENTATIONS

Overview

Figure 1A:
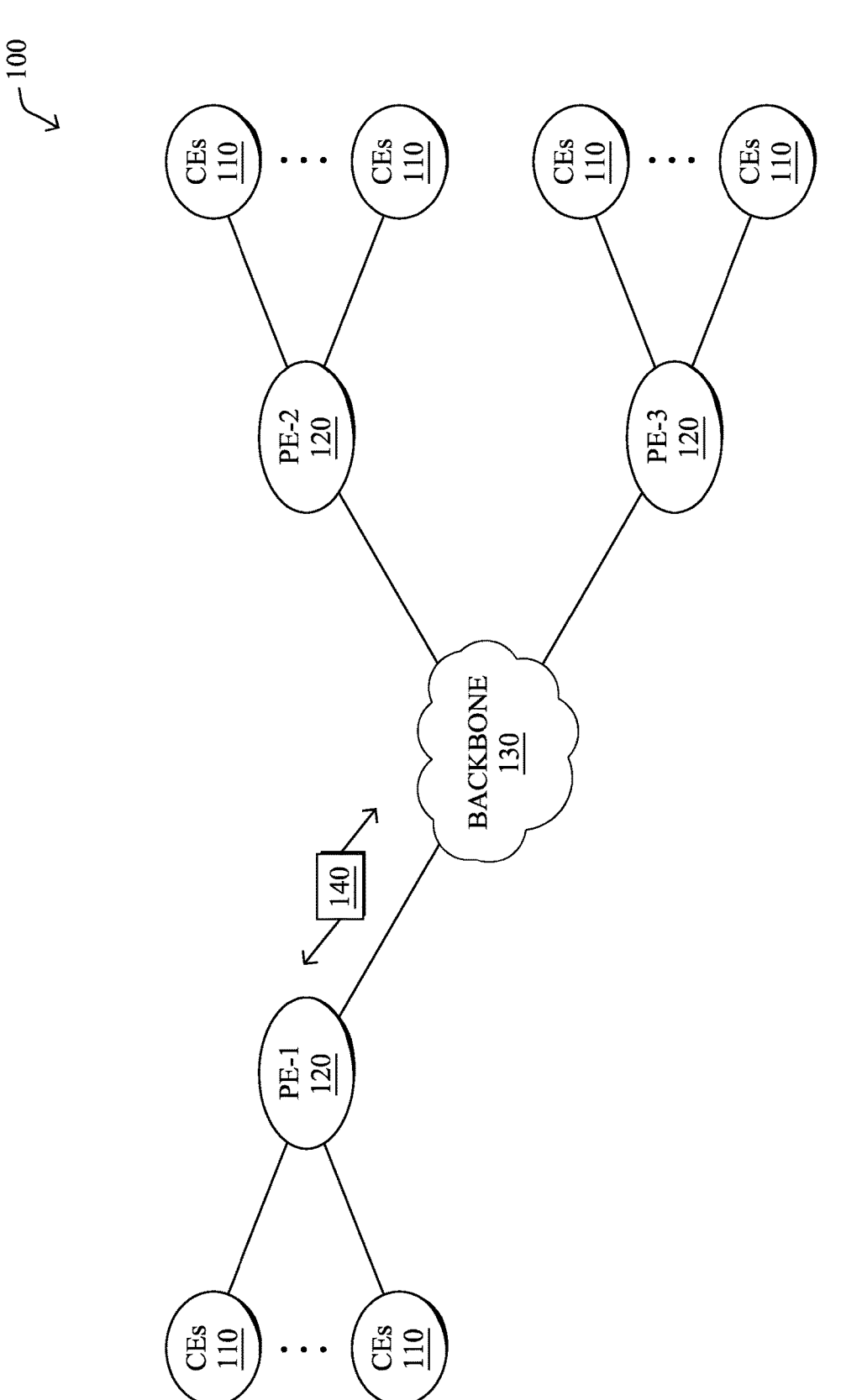
FIGS. 1A-1B illustrate an example communication network.

According to one or more implementations of the disclosure, a device pauses generation of computer code by a language model. The device matches a block of the computer code to a hint regarding a portion of the block of computer code. The device inserts the hint into the computer code. The device resumes generation of the computer code by the language model, wherein the language model uses the hint to generate a new portion of the computer code.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection). Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
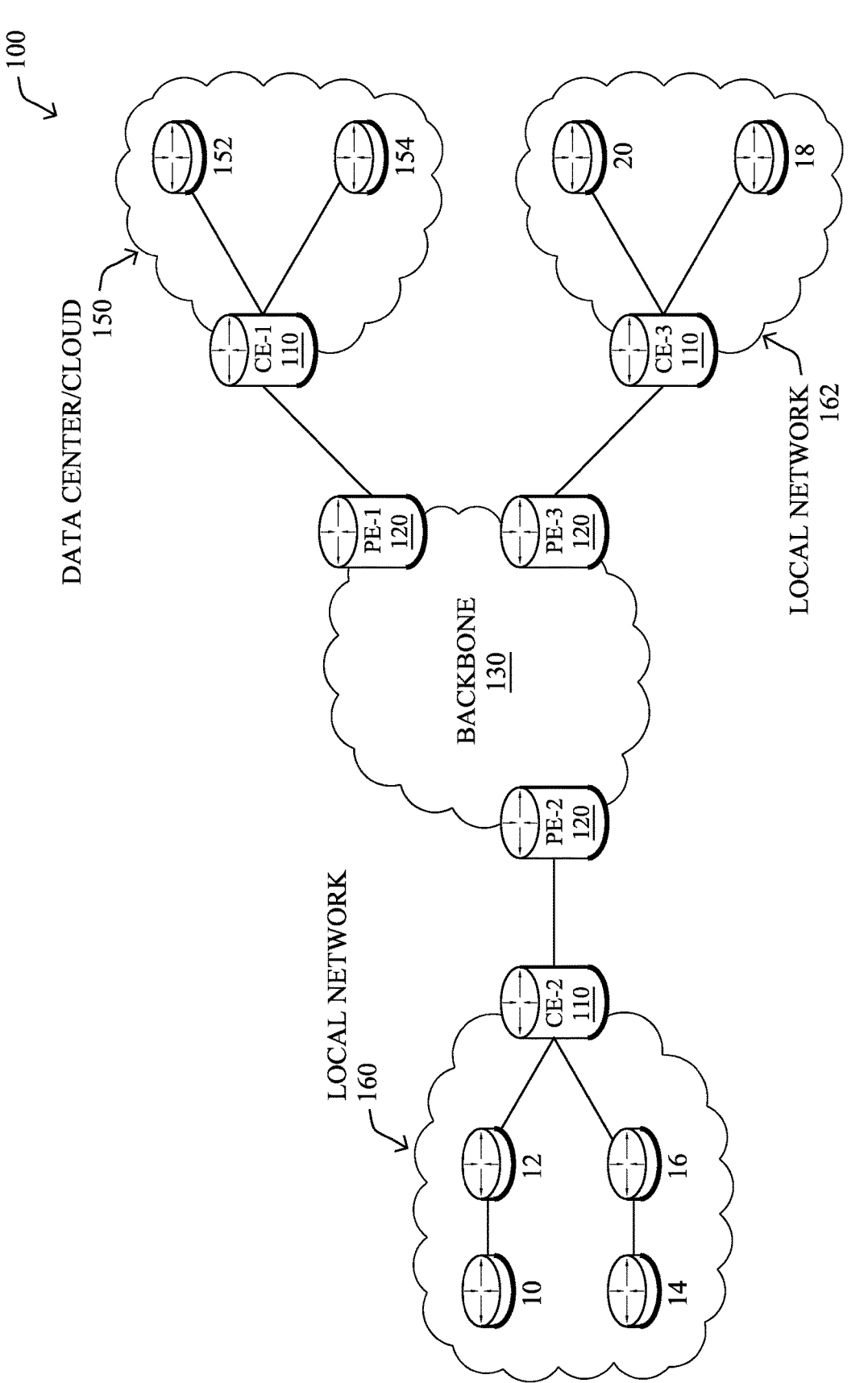

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
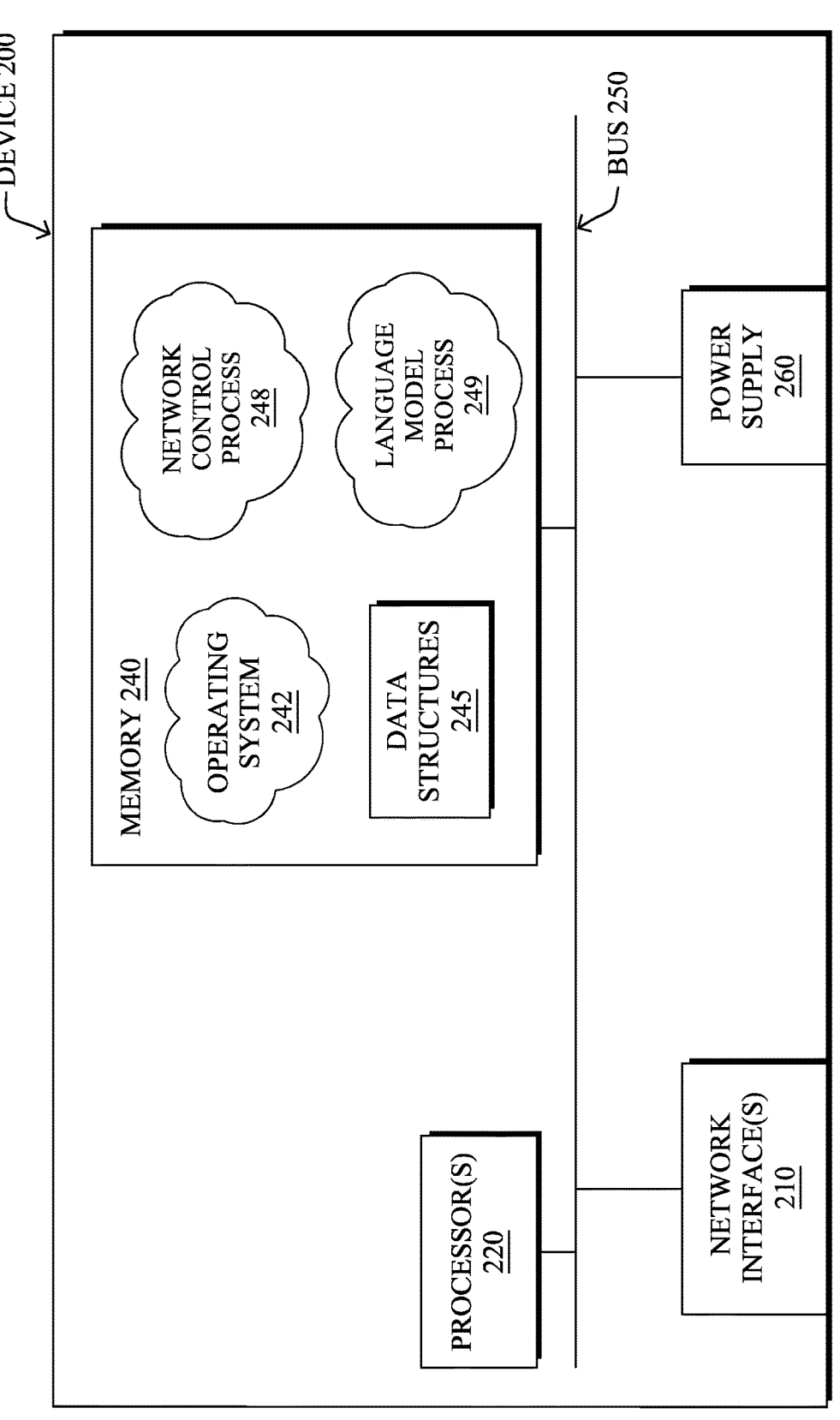
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, network control process 248 and/or language model process 249 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
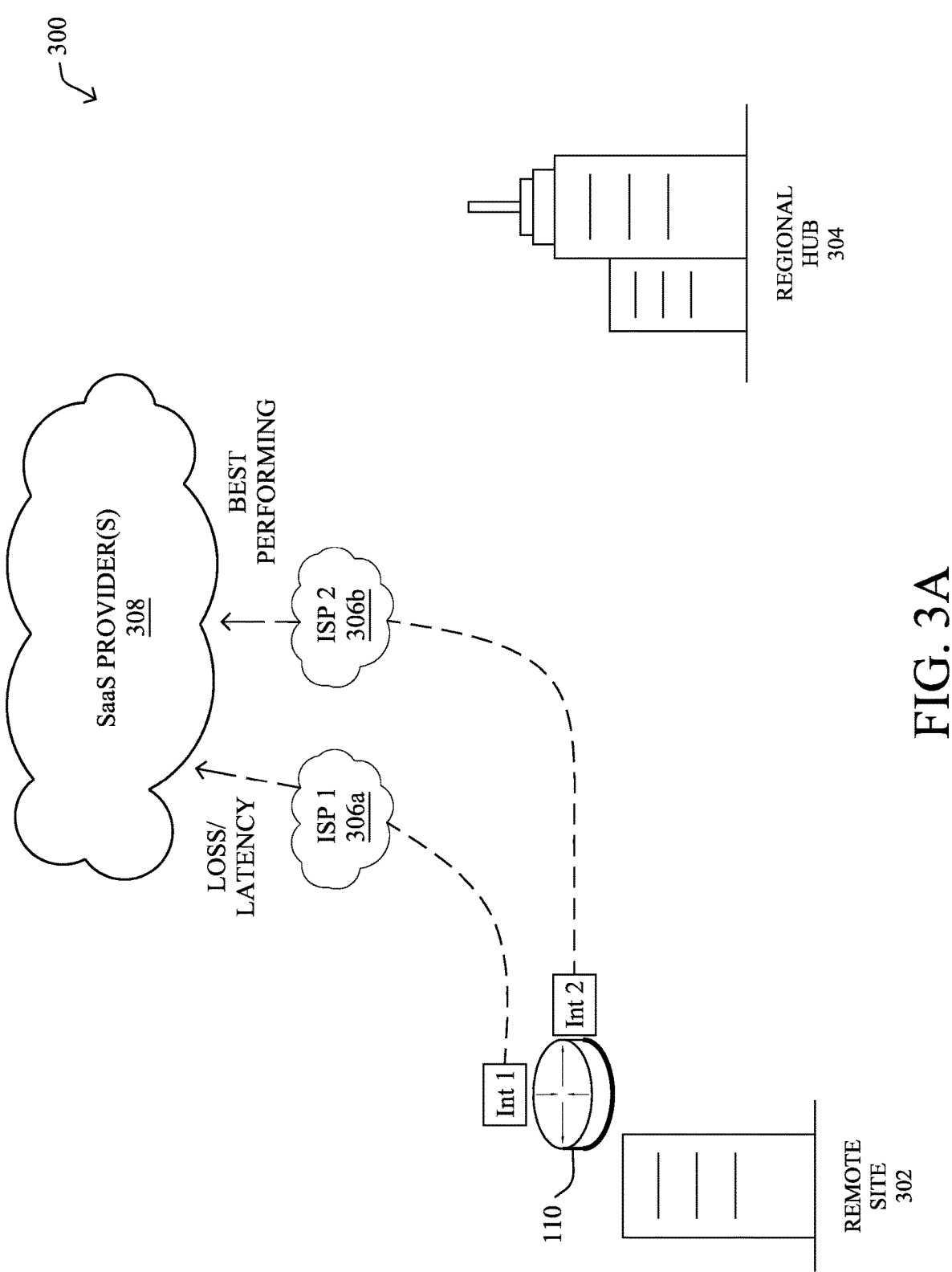
FIGS. 3A-3B illustrate example network deployments.
Figure 3B:

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
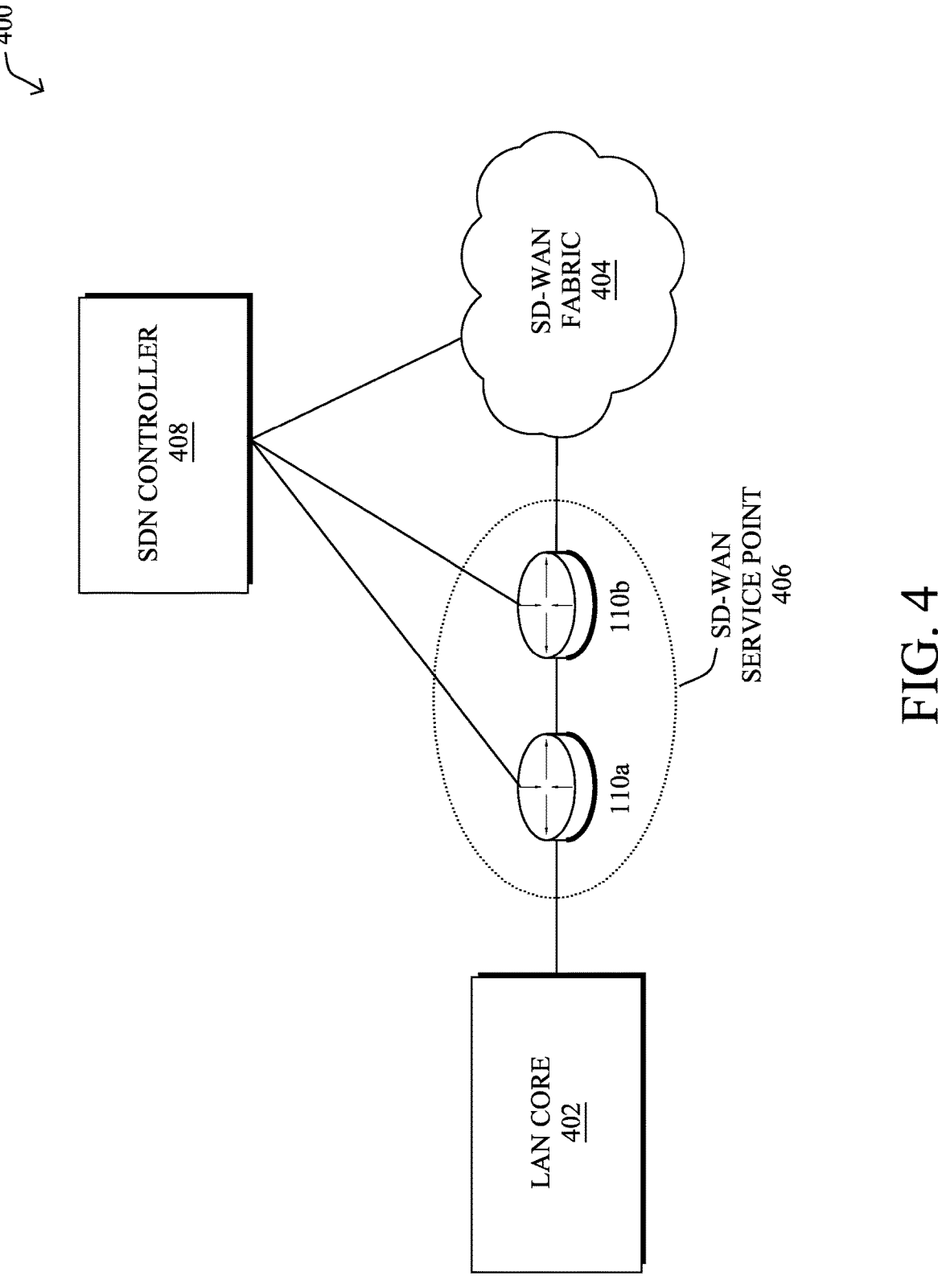
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS. LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in Large Language Models (LLMs), such as ChatGPT and GPT-4, have paved the way to a myriad of new applications. The ability of these models to follow instructions allows for interactions with tools (also called plugins), such as code interprets. Making language models write code that can then be executed is very powerful capability, as it indirectly allows the models to interact with external systems to retrieve information or even take actions. A limited number of powerful general-purpose models such as GPT-4 can write good quality code that is often correct. In addition, code-specific models trained or fine-tuned on large datasets consisting of code are available as well for code-specific tasks.

In both cases, the models usually have some implicit knowledge of languages and of the interfaces of libraries through the data on which they were trained. For example, GPT-4 was trained on data up to September 2021, which includes a lot of documentation and examples on how to use the popular Python package pandas for data frame manipulation. However, packages evolve continuously, and more recent versions of pandas can have new interfaces, as well as changed or removed interfaces. When writing and executing code, developers usually pick specific versions of packages, and the diffuse and possibly outdated knowledge of the LLM can become an issue (e.g., the model may not be able to use new interfaces or may run into errors when interfaces have changed). This is particularly true in highly dynamic environments, such as network analytics systems.

In addition to the interfaces of utility packages, writing code requires interacting with data. For instance, an LLM could potentially be used to check devices managed by a network controller, such as by querying a specific application programming interface (API) for devices, which takes a list of parameters and returns a list of device objects. As for packages, models sometimes have learned some aspects of common APIs when they are public. However, these also can be out of date. Indeed, such APIs tend to update frequently. In addition, many APIs are either private or public, but poorly documented, and the models may have very limited knowledge about what a given API will return.

As would be appreciated, language models, such as LLMs, generate code token-by-token, where a token replaces a sequence of a few characters. At every step, a score is associated to all tokens in the vocabulary, and the model picks the most likely token. The score distribution is purely dependent on the model itself, though, and can suffer from the following issues:

The model may generate code that is incorrect—e.g., by accessing a function, method, or record key that does not exist or with a close-but-incorrect name.

The model may be unable to proceed when it does not have the requisite information—e.g., if it has no idea which field to access when using a data frame.

—Using a LLM for Code Generation for Network Analytics with Coding Hints—

The techniques herein improve the performance of LLMs and other language models when writing code and using libraries or APIs, especially those that are poorly documented, old, or running a version that is more recent than the training time of the model. To achieve this, the techniques herein introduce several mechanisms: i.) providing line-by-line hints to the language model as it writes code and ii.) constraining the decoding to the subset of tokens that lead to meaningful code.

More specifically, in some implementations, the techniques herein provide for any or all of the following:

Generating chunks of code iteratively as in a cell-based notebook and providing systematic feedback to the model about the structure and contents of the latest expressions or assigned variables.

Constraining the model to only generate code that is syntactically correct, as well as correct from a library and data interface perspective (e.g., not allowing the model to generate code that access a method that does not exist). This can leverage standards such as the Language Server Protocol (LSP) or custom protocols.

Backtracking token generation when an exception is hit, to explore other beams of tokens that might avoid the issue.

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Specifically, according to various implementations, a device pauses generation of computer code by a language model. The device matches a block of the computer code to a hint regarding a portion of the block of computer code. The device inserts the hint into the computer code. The device resumes generation of the computer code by the language model, wherein the language model uses the hint to generate a new portion of the computer code.

Figure 5:
FIG. 5 illustrates an example architecture for using a language model for code generation for network analytics with coding hints.

Operationally, FIG. 5 illustrates an example architecture 500 for using a language model for code generation for network analytics with coding hints, according to various implementations. At the core of architecture 500 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 514, either locally or via a network (e.g., via one or more APIs, etc.).

As shown, language model process 249 may include any or all of the following components: a language model 502, a notebook interpreter 504, a code intelligence logit processor 506, an agent 508, and/or a model fine-tuning engine 510. As would be appreciated, the functionalities of these components may be combined or omitted, as desired. In addition, these components may be implemented on a singular device or in a distributed manner, in which case the combination of executing devices can be viewed as their own singular device for purposes of executing language model process 249.

In various implementations, language model process 249 may include language model 502, or multiple such models, which is configured to generate textual responses given a set of input text. In some cases, language model 502 may also take the form of an LLM, such as ChatGPT or the like. During execution, language model 502 may generate computer code, such as scripts or other executable code, based on a request to do so, such as from user interface 512, another system that interacts with language model process 249, or the like.

Notebook interpreter 504 may operate in conjunction with language model 502 to implement a supervision loop over language model 502 that performs iterative decoding, simulating a cell-based notebook, where some details about the last expressions or assignments are assessed when a given block of code generated by language model 502 is executed.

More specifically, notebook interpreter 504 may first initialize a decoding loop with language model 502 whereby an initial prompt provides instructions to language model 502 regarding the code to be generated. For instance, a user may specify via user interface 512 that certain information stored by network controller 514 is to be queried via an API and that language model 502 is to generate the code to do so. In turn, language model 502 may begin generating the specified code. Then, whenever language model 502 has generated a block of the code (e.g., whenever two newline characters are seen in a row), notebook interpreter 504 may pause further code generation by language model 502 until it has evaluated the existing block of code.

In some implementations, for each block of code written by language model 502, notebook interpreter 504 may execute that block in an interpreter session. The session remains for the duration of the process, so that variables defined in one block are also available in another block. After the block has been executed:

If there was no error, then notebook interpreter 504 may generate code hints based one or a few of the assignments or expressions seen in the block.

For each such value/hint, notebook interpreter 504 may print (e.g., pretty print) it in a compact format that truncates long lists or other data structures to keep the hint brief and avoid using up a large number of tokens.

If there was an exception, multiple modes of operation are also possible:

In one implementation, notebook interpreter 504 may print a short version of the exception. In some cases, notebook interpreter 504 may also suppress the stack trace, as it will often consist of frames in library code that are not useful for fixing the issue. In addition, hints related to expressions involved in the exception can be provided by notebook interpreter 504.

In another implementation, notebook interpreter 504 my opt to roll back the whole block of code, or a fraction thereof, from the decoding session, and a new beam can be explored by sampling new tokens. By using sampling instead of deterministically picking the highest score token, a new block can be produced by language model 502 that may not run into the issue. This is similar to how Tree-of-Thoughts operate.

Notebook interpreter 504 may also select the mode of operation statistically, based on a configuration, or picked on a case-by-case basis using heuristics. For instance, on the first failure, print the exception and hints, and have the model retry. If another similar failure occurs, bail and backtrack by rolling back the whole block).

As would be appreciated, notebook interpreter 504 could be implemented in a number of ways. For instance, notebook interpreter 504 could be implemented using public APIs such as the OpenAI APIs by making successive calls and leveraging stopping expression parameters. However, doing so could be inefficient as after every new cell execution, a prompt with all the history needs to be reprocessed to the model. Instead, the techniques herein are likely to be best used when running a custom decoding loop where it is possible to stop and resume the code generation.

By way of example, FIGS. 6A-6B illustrate examples of the generation of code by a language model with coding hints. As shown in example 600 in FIG. 6A, assume that a user issues the input request 606 via user interface 512, asking language model 502 to write code in Python to access certain data (e.g., the heaviest cat) that is available via a certain API. In turn, language model 502 may generate code 604. However, despite the user specifying certain information about the API methods available, the resulting code may end up causing an error as the model fails to correctly call the 'get' method since the 'cat' object is actually a dictionary of the form {"id": 1234}. Language model 502 has no way of knowing that, thereby resulting in a failed attempt.

Now, assume that notebook interpreter 504 pauses the code generation by language model 502 after each block of code, and evaluates it to provide hints before resuming the code generation, as shown in example 610 in FIG. 6B. Here, on assessing the first block of code regarding the cat list, notebook interpreter 504 may insert a first hint 612 as a code comment or other feedback to language model 502 that provides additional context to it regarding the assignment or expression in the preceding block. Then, later on, assume that notebook interpreter 504 determines that the subsequent block of code 614 would result in a key error. In such a case, it may insert hint 616 into the code before resuming the code generation, thereby allowing language model 502 to revise code 614 into code 618 before continuing onward. Thus, even though language model 502 was not trained on the specific data structure involved, the insertion of the hints allows it to adjust its code generation to conform to the necessary format.

Referring again to FIG. 5, code intelligence logit processor 506 may also participate in the decoding loop performed between language model 502 and notebook interpreter 504. Every time language model 502 produces a set of scores for all tokens in the vocabular for the next token, code intelligence logit processor 506 may use contextual information to limit the available tokens only to those that make sense with respect to contextual suggestions.

For instance, code intelligence logit processor 506 may provide constraints for Python or other dictionary keys: when the currently generated block by language model 502 is about to access a key of a dictionary, code intelligence logit processor 506 may an constraint the text to match one of the known keys for the dictionary, based on the value in the interpreter session. Doing so would be akin to a drop-down box that may be shown to a human developer, as shown in example 700 in FIG. 7A.

In further instances, code intelligence logit processor 506 could also provide constraints for methods: when the currently generated block by language model 502 is about to access a function or a method on an existing object, code intelligence logit processor 506 could constrain the text to match one of the known methods on the object. Doing so would be akin to a drop-down box that may be shown to a human developer, as shown in example 710 in FIG. 7B.

In another example, code intelligence logit processor 506 could provide constraints on the language syntax such that language model 502 only considers tokens that would lead to valid language syntax.

Both notebook interpreter 504 and code intelligence logit processor 506 may function to help improve the overall quality and robustness of the code generated by language model 502. Preferably, the two may be used in conjunction with one another as constraining based on code intelligence along may not be enough if the model has no context that would allow to choose between these valid options. The cell-based evaluation with hints allows to build up that context in a step-by-step fashion.

As shown in FIG. 5, language model process 249 may also include an agent that can leverage language model 502, notebook interpreter 504, and/or code intelligence logit processor 506. In a first implementation, agent 508 can directly leverage language model 502 to write code as a final output, as used in code generating assistants. In another implementation, agent 508 could leverage language model

502 in a multi-step process that generates code to answer a user question (e.g., by fetching API data from multiple systems and merging them).

Finally, model fine-tuning engine 510 may optionally function to help fine-tune (e.g., update) language model 502 over time. To do so, model fine-tuning engine 510 may use decoding logs from code completions generated using notebook interpreter 504 and code intelligence logit processor 506, to fine tune the model, so as to avoid recurring errors or cases where the decoding loop must backtrack from exceptions multiple times before reaching an acceptable completion. Techniques such as adapters, such as Low-Rank Adaptation of LLMs (LoRA) or quantized variants of LoRA, can be used to keep the fine-tuning costs low.

Figure 8:
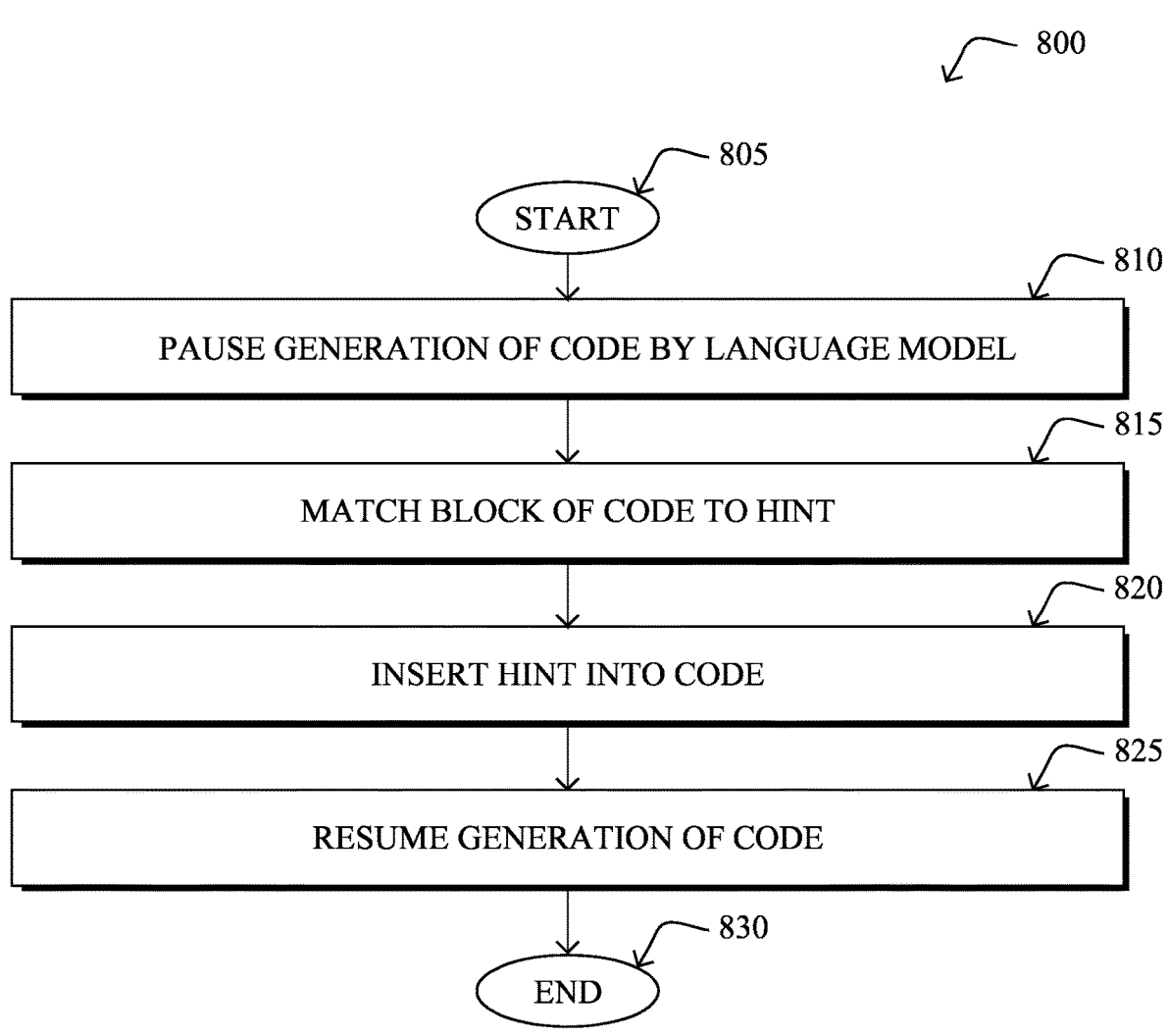
FIG. 8 illustrates an example simplified procedure for using a language model for code generation for network analytics with coding hints.

FIG. 8 illustrates an example simplified procedure 800 (e.g., a method) for using a language model for code generation for network analytics with coding hints, in accordance with one or more implementations described herein. For example, a non-generic, specifically configured device (e.g., device 200), such as a router, firewall, controller for a network (e.g., an SDN controller or other device in communication therewith), server, or the like, may perform procedure 800 by executing stored instructions (e.g., language model process 249 and/or network control process 248). The procedure 800 may start at step 805, and continues to step 810, where, as described in greater detail above, the device may pause generation of computer code by a language model. In various implementations, the language model is a large language model (LLM). In addition, the computer code may also be associated with a network controller, in some instances.

At step 815, as detailed above, the device may match a block of the computer code to a hint regarding a portion of the block of computer code. In various instances, the portion of the block of code comprises an assignment or expression. In some implementations, the device matches the block of the computer code to a hint by evaluating tokens that represent portions of the block of computer code. In one implementation, the device may also execute the block of the computer code while generation of the computer code is paused, to determine whether the block raises an error or exception. In such cases, the device may cause the language model to roll back the block when it raises an error or exception. In further instances, the device may update the language model, based in part on the error or exception.

At step 820, the device may insert the hint into the computer code, as described in greater detail above. In various implementations, the hint is associated with an assignment or expression generated by the language model in the portion of the block of computer code.

At step 825, as detailed above, the device may resume generation of the computer code by the language model, wherein the language model uses the hint to generate a new portion of the computer code. In some implementations, the device may also provide one or more constraints to the language model for generation of the new portion of the computer code, based on the block of the computer code.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for classifying failure modes of LLMs for computer network analytics, it is to be understood that various other adaptations and modifications may be made within the spirit and scope of the implementations herein. For example, while certain implementations are described herein with respect to using certain models for purposes of predicting application experience metrics, SLA violations, or other disruptions in a network, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:
pausing, by a device, generation of computer code by a language model;
matching, by the device, a block of the computer code to a hint regarding a portion of the block of computer code;
inserting, by the device, the hint as non-executable text within the computer code, wherein the hint comprises a context-providing annotation; and
resuming, by the device, generation of the computer code by the language model, including providing to the language model the computer code that includes the hint configured such that the language model uses the hint to generate a new portion of the computer code.

2. The method as in claim 1, wherein the portion of the block of code comprises an assignment or expression.

3. The method as in claim 1, wherein the language model is a large language model (LLM).

4. The method as in claim 1, wherein the device matches the block of the computer code to a hint by evaluating tokens that represent portions of the block of computer code.

5. The method as in claim 1, wherein the hint is associated with an assignment or expression generated by the language model in the portion of the block of computer code.

6. The method as in claim 1, further comprising:
executing the block of the computer code while generation of the computer code is paused, to determine whether the block raises an error or exception.

7. The method as in claim 6, further comprising:
causing the language model to roll back the block when it raises an error or exception.

8. The method as in claim 6, further comprising:
updating the language model, based in part on the error or exception.

9. The method as in claim 1, further comprising:
providing one or more constraints to the language model for generation of the new portion of the computer code, based on the block of the computer code.

10. The method as in claim 1, wherein the computer code is associated with a network controller.

11. An apparatus, comprising:
one or more network interfaces;
a processor coupled to the one or more network interfaces and configured to execute one or more processes; and
a memory configured to store a process that is executable by the processor, the process when executed configured to:
pause generation of computer code by a language model;
match a block of the computer code to a hint regarding a portion of the block of computer code;
insert the hint as non-executable text within the computer code, wherein the hint comprises a context-providing annotation; and
resume generation of the computer code by the language model, including providing to the language model the computer code that includes the hint configured such that the language model uses the hint to generate a new portion of the computer code.

12. The apparatus as in claim 11, wherein the portion of the block of code comprises an assignment or expression.

13. The apparatus as in claim 11, wherein the language model is a large language model (LLM).

14. The apparatus as in claim 11, wherein the apparatus matches the block of the computer code to a hint by evaluating tokens that represent portions of the block of computer code.

15. The apparatus as in claim 11, wherein the hint is associated with an assignment or expression generated by the language model in the portion of the block of computer code.

16. The apparatus as in claim 11, wherein the process when executed is further configured to:
execute the block of the computer code while generation of the computer code is paused, to determine whether the block raises an error or exception.

17. The apparatus as in claim 16, wherein the process when executed is further configured to:
cause the language model to roll back the block when it raises an error or exception.

18. The apparatus as in claim 16, wherein the process when executed is further configured to:
update the language model, based in part on the error or exception.

19. The apparatus as in claim 11, wherein the process when executed is further configured to:
provide one or more constraints to the language model for generation of the new portion of the computer code, based on the block of the computer code.

20. A tangible, non-transitory, computer-readable medium storing program instructions that cause a device to execute a process comprising:
pausing, by the device, generation of computer code by a language model;
matching, by the device, a block of the computer code to a hint regarding a portion of the block of computer code;
inserting, by the device, the hint as non-executable text within the computer code, wherein the hint comprises a context-providing annotation; and resuming, by the device, generation of the computer code by the language model, including providing to the language model the computer code that includes the hint configured such that the language model uses the hint to generate a new portion of the computer code.

* * * * *